DIFFERENTIAL FREQUENCY RATE SYSTEM FOR PROVIDING A PULSE TRAIN OUTPUT CORRESPONDING TO THE FREQUENCY DIFFERENCE BETWEEN TWO INPUT PULSE TRAINS

Filed Oct. 4, 1966

INVENTORS
TOSHITAKA SUZUKI
TORU SUGAWARA
BY Paul M. Craig, Jr.
ATTORNEYS

BY

INVENTORS
TOSHITAKA SUZUKI
TÔRU SUGAWARA
Paul M. Craig, Jr.
ATTORNEYS

INVENTORS
TOSHITAKA SUZUKI
TÔRU SUGAWARA

BY Paul M. Craig, Jr.
ATTORNEYS

INVENTORS
TOSHITAKA SUZUKI
TÔRU SUGAWARA

BY Paul M. Craig, Jr.
ATTORNEYS

DIFFERENTIAL FREQUENCY RATE SYSTEM FOR PROVIDING A PULSE TRAIN OUTPUT CORRESPONDING TO THE FREQUENCY DIFFERENCE BETWEEN TWO INPUT PULSE TRAINS

Filed Oct. 4, 1966

INVENTORS
TOSHITAKA SUZUKI
TORU SUGAWARA

BY Paul M. Craig, Jr.
ATTORNEYS

United States Patent Office 3,448,389

Patented June 3, 1969

3,448,389

DIFFERENTIAL FREQUENCY RATE SYSTEM FOR PROVIDING A PULSE TRAIN OUTPUT CORRESPONDING TO THE FREQUENCY DIFFERENCE BETWEEN TWO INPUT PULSE TRAINS

Toshitaka Suzuki and Tôru Sugawara, Hitachi-shi, Japan, assignors to Hitachi, Ltd., Tokyo-to, Japan Filed Oct. 4, 1966, Ser. No. 584,255

Claims priority, application Japan, Oct. 4, 1965, 40/61,160; June 3, 1966, 41/35,429

Int. Cl. H03k *9/06;* H03d *13/00;* H03b *3/04*

U.S. Cl. 328—133 18 Claims

This invention relates to a differential frequency rate system, and more particularly to a system of the character which derives from first and second pulse trains, a third pulse train representing the instantaneous frequency difference between the first and second pulse trains.

In order to get a signal proportional to the frequency difference between two input pulse trains, a number of different devices have been used. One of them is a combination of a gate and an add and subtract reversible digital counter. Another device is a combination of a bistable circuit and a number of gates.

However, operation of these known devices is erratic when corresponding pulses arrive at each input in phase coincidence with each other. One known attempt (described in U.S. Patent 2,866,092, issued Dec. 23, 1958) to avoid this problem is made by an addition to known devices of an input circuit comprised mainly by a phase coincidence circuit and a phase anti-coincidence circuit coupled with a number of gates and delay means. Through a considerable improvement is obtained by this attempt, the device is complicated in structure. In addition, it is found that the device is still erratic because it is difficult to improve phase discrimination resolution of the input circuit.

Accordingly, the main object of the invention is to provide an accurate differential frequency rate system in which an output third train is produced having an instantaneous frequency accurately corresponding to the frequency difference between first and second pulse trains even when pulse coincidence occurs.

Another object of the invention is to provide a differential frequency rate apparatus of this character which may be constructed in a simple circuit configuration using conventional circuit elements.

Still another object of the invention is to provide a differential frequency rate system which is suitable to obtain a third pulse train representing the frequency difference of first and second pulse trains where the frequency of the first pulse train is either equal to or larger than that of the second pulse train.

Other features and advantages of the invention will become apparent from the following description taken in conjunction with the drawings, wherein.

Figure 3:
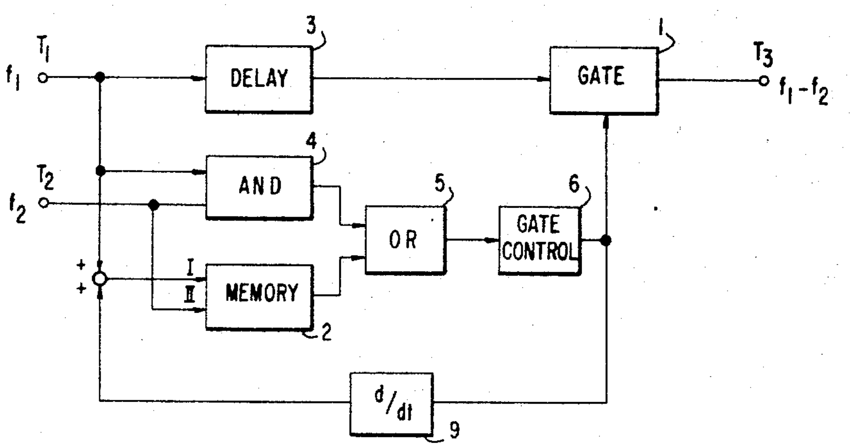
FIGURE 3 is a block diagram of a differential frequency rate system embodying the teaching of the invention.
Figure 5:
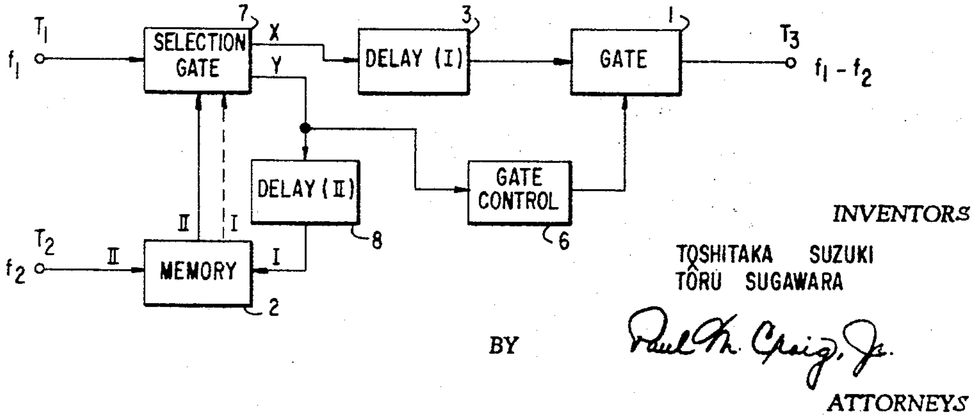
Figure 4A:
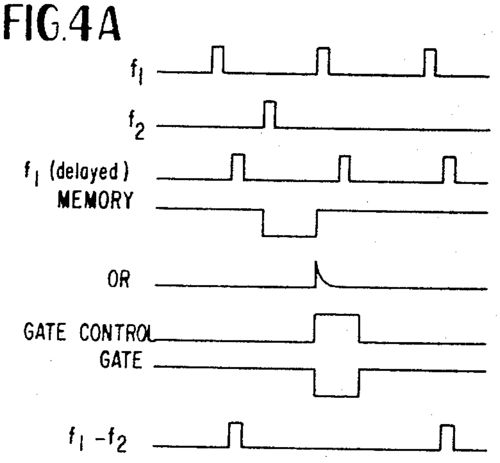
Figure 4B:
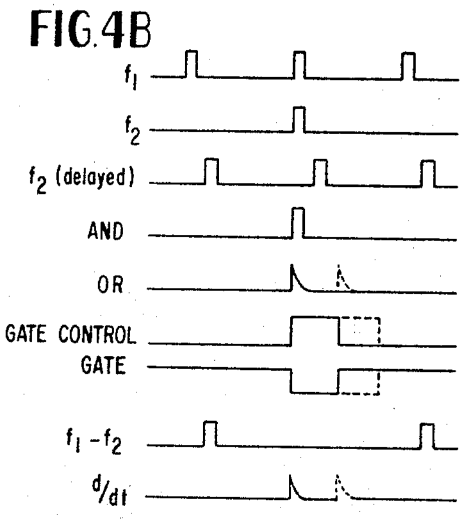
Figure 6:
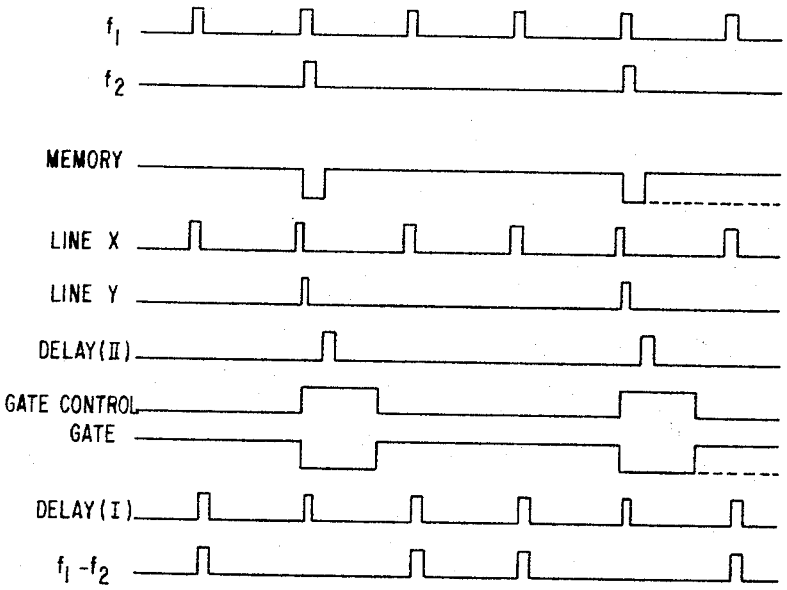
Figure 7:
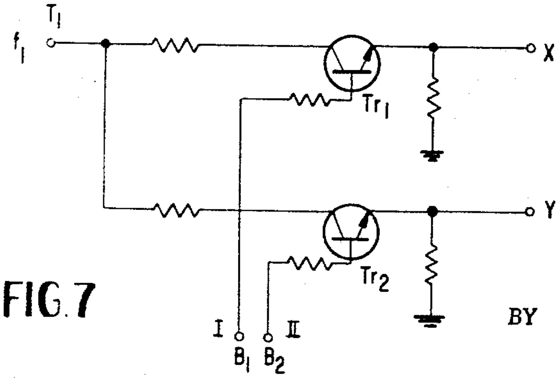
Figure 8:
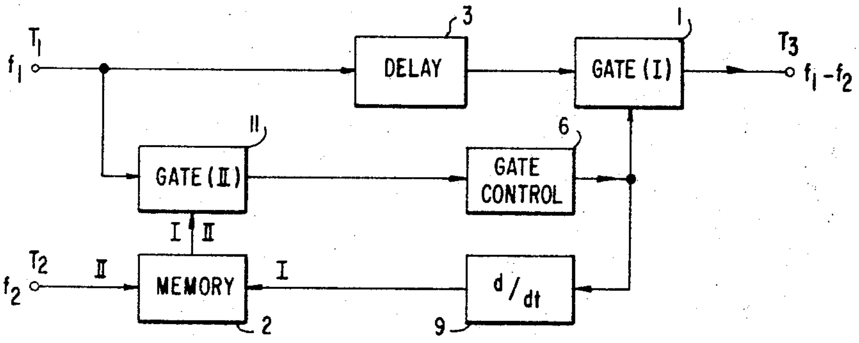
Figure 9A:
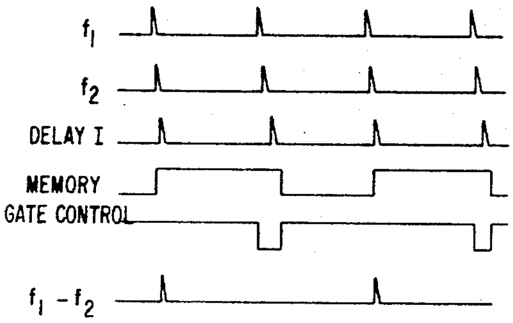
Figure 9B:
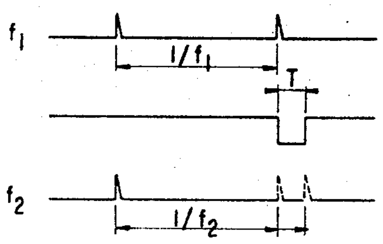
Figure 10:
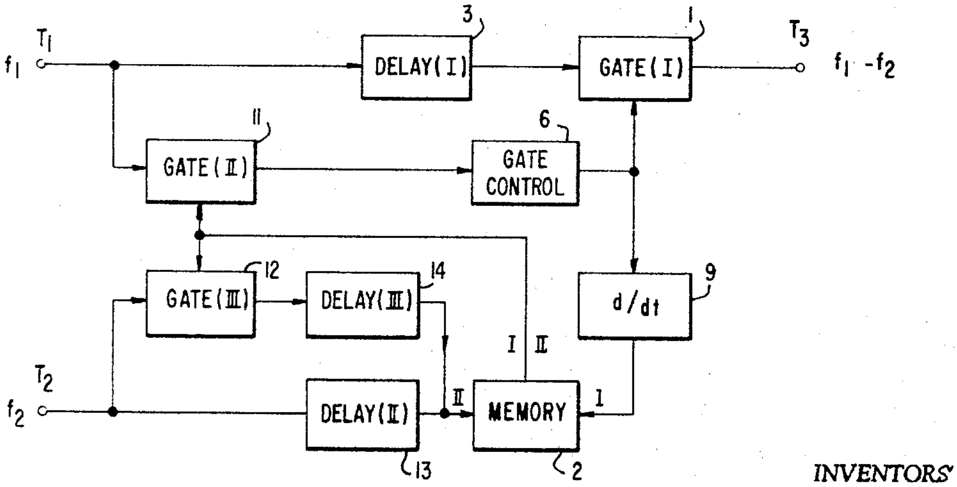
Figure 11:
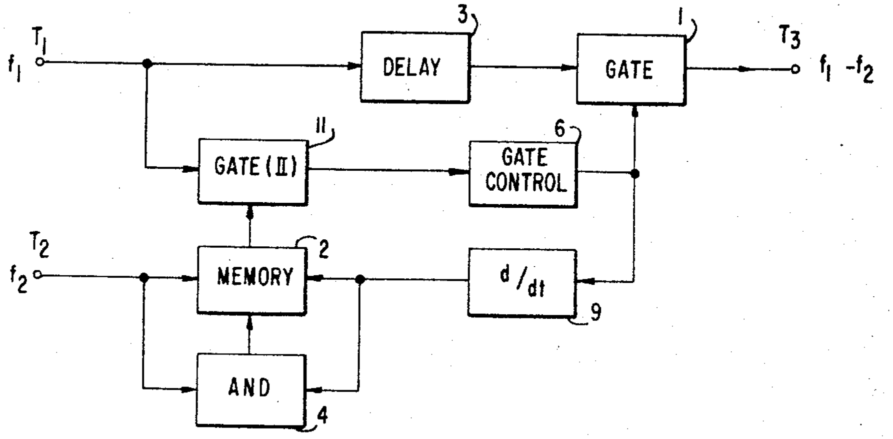
Figure 12A:
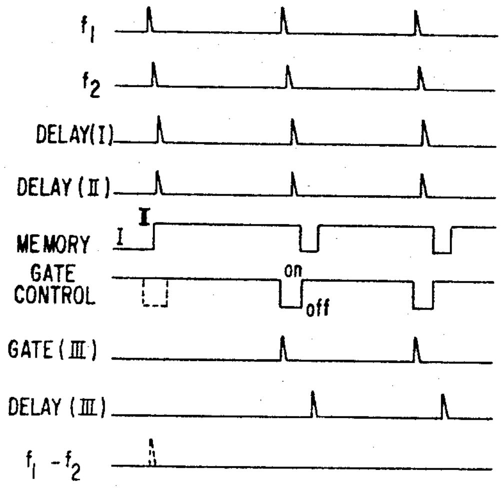
Figure 12B:
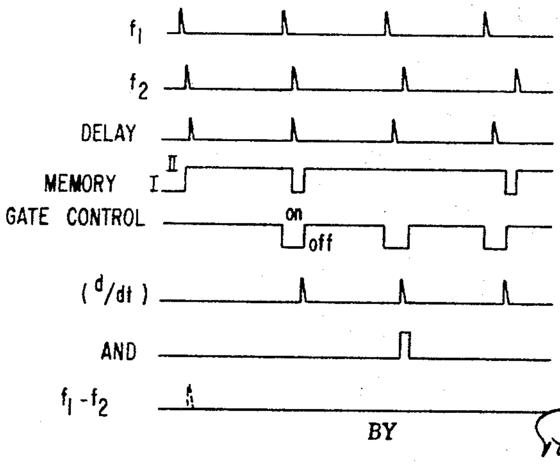
Figure 13:
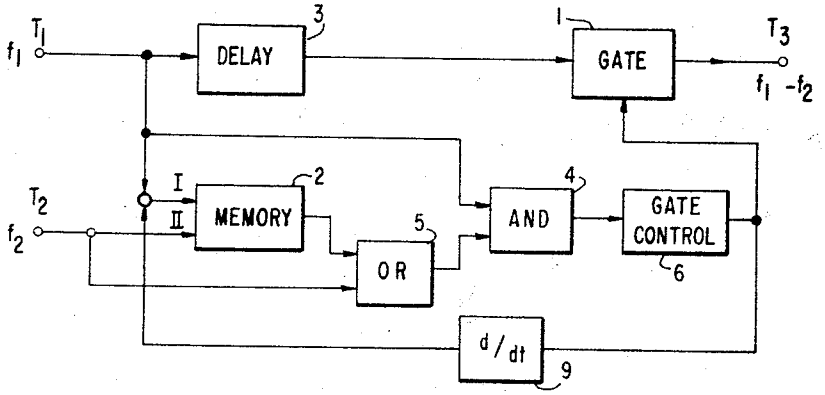
Figure 14:
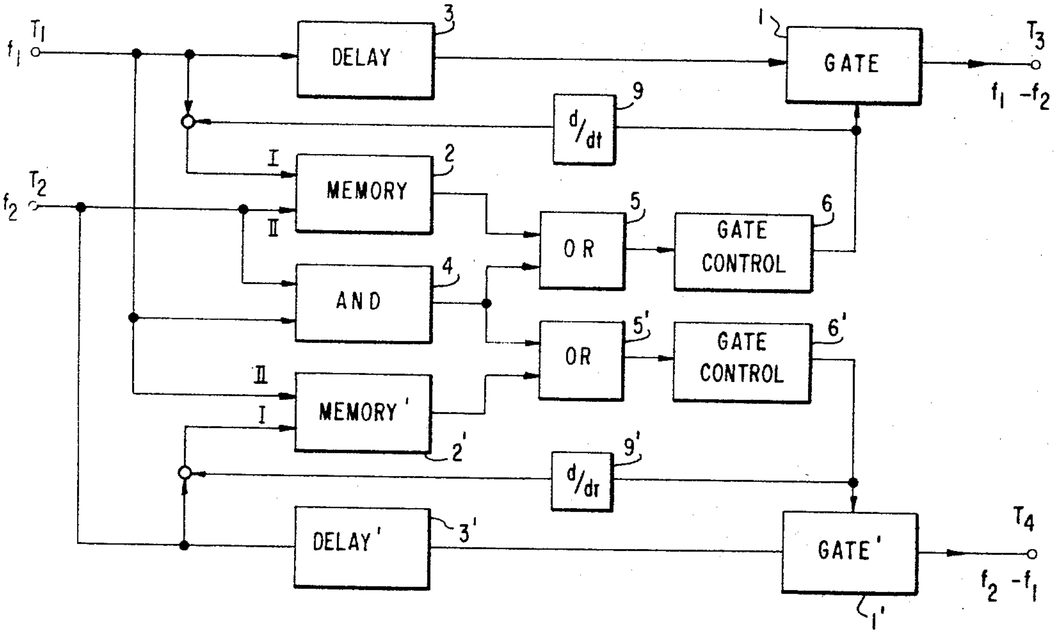

FIGURES 4 (A) (B) are a series of pulse-time characteristic curves to explain the mode of operation of the system shown in FIGURE 3;

FIGURE 5 is a block diagram of a second embodiment of a differential rate frequency system according to the invention;

FIGURE 6 is a series of pulse-time operating characteristics of the system shown in FIGURE 5;

FIGURE 7 is an example of a gate circuit employed in the system in FIGURE 5;

FIGURE 8 is a block diagram of a third form of differential rate frequency system according to the invention;

FIGURE 9 illustrates the pulse-time operating characteristics of the system shown in FIGURE 8;

FIGURES 10 and 11 are block diagrams of still other embodiments according to the invention;

FIGURES 12 (A) (B) are pulse-time curves illustrating the manner of operation of the systems shown in FIGURE 10 and FIGURE 11, respectively;

FIGURE 13 is a block diagram of an embodiment of the invention which is modified from the system in FIGURE 3;

FIGURE 14 is a block diagram of still another embodiment of the invention; and

Figure 15:
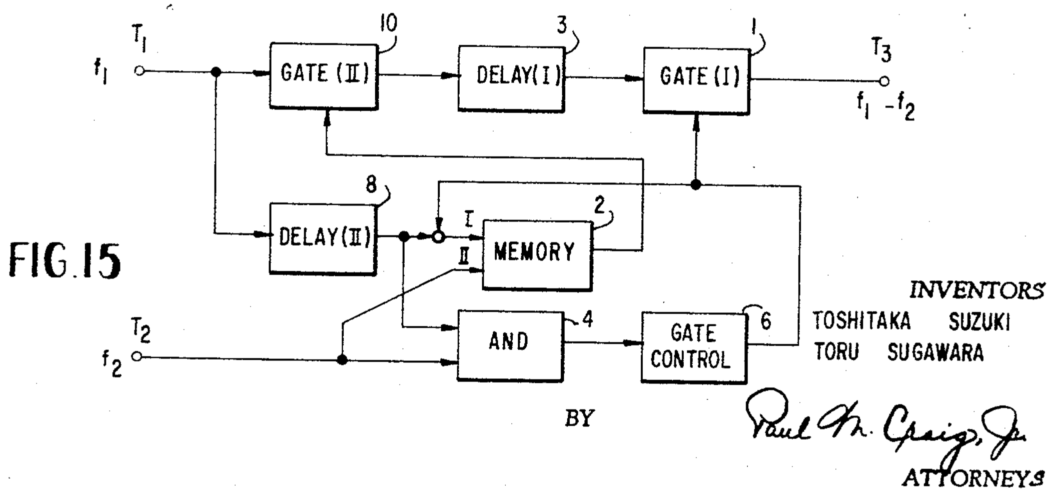

FIGURE 15 is a block diagram of still further embodiment of the invention which is modified from the systems shown in FIGURE 3 and in FIGURE 5; and wherein like reference characters and legends denote corresponding parts throughout the drawings.

Figure 1:
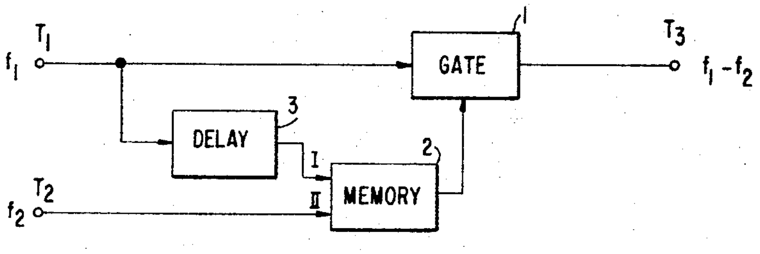
FIGURE 1 is a block diagram of a known differential frequency rate circuit.

FIGURE 1 shows a known differential frequency rate circuit. To input terminals $T_1$ and $T_2$ receive first and second pulse trains $f_1$, $f_2$, respectively. Gate 1 is connected to $T_1$ and is controlled by Memory 2 which has two steady states (or two output levels), say, state I and state II, dependent upon receipt of its input signals I and II. Memory 2 assumes the state I and makes Gate 1 conductive (on) when it receives an input signal I. Reciprocally, it assumes state II and makes Gate 1 nonconductive (off) when it receives a signal II. Memory 2 is a memory means and is preferably comprised by a conventional asymmetrical flip-flop type memory circuit. Gate I is comprised of a conventional diode gate circuit or a transistor or electric tube gate circuit. Delay 3 is a conventional delay circuit having a delay time considerably shorter than the recurrence rate or period of the pulse train $f_1$.

An assumption will be made in the following description that the frequency (or recurrence rate) of the pulse train $f_1$ is either equal to or larger than that of the pulse train $f_2$ and that Memory 2 is in the state I when first $f_1$ pulse in FIGURE 2 arrives at the terminal $T_1$. The first pulse passes through Gate 1 and appears as an output signal at the terminal $T_3$. After the delay time $T_D$ of Delay 3, it is also given to Memory 2 but it does not change the state of Memory 2.

Next, when the first $f_2$ pulse arrives at the terminal $T_2$, Memory 2 is turned from the state I to the state II and it closes or turns Gate 1 off. Therefore, the next $f_1$ pulse is not transmitted through gate 1 to the terminal $T_3$ while it changes Memory 2 from the state II to the state I after delay period $T_D$ has elapsed. By the repetition of this operation, every $f_2$ pulse prevents the next succeeding (corresponding) $f_1$ pulse from passing through Gate 1 so that the recurrence rate difference $f_1 - f_2$ appears at the terminal $T_3$ as an output pulse train.

Figure 2:
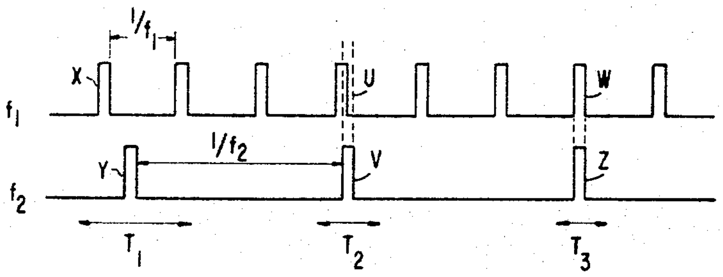
FIGURE 2 shows a set of typical waveshapes of first and second pulse trains to be compared.

Though operation of this device is precise when corresponding pulses of $f_1$ and $f_2$ arrive at different times as shown at X and Y in FIGURE 2, the operation becomes erratic or unpredictable when the pulses arrive in phase coincidence or in an overlapping time relation with each other as shown at U, V and W, Z whether Memory 2 exhibits the state I or the state II is unpredictable. In addition, during the time that is needed to change completely the state of Memory from one another, operation of Gate 1 becomes necessarily erratic.

According to this invention, to avoid these problems simple back up circuits are employed which are effectively combined with Gate 1 and Memory 2 to prevent their erratic operation under any circumstances. Gate 1 is controlled by gate control means. The gate control means may be controlled by back up means in cooperation with or instead of Memory 2 when corresponding pulses of first and second pulse trains arrive in substantial phase coincidence with each other. In addition, Memory 2 is always reset to a predetermined one of its states in accordance with every occurrence of actual prevention of transmission of the $f_1$ pulse train. Therefore, there appears at the output of Gate 1, a pulse train accurately and instantaneously representing the frequency or recurrence rate difference between $f_1$ and $f_2$ pulse trains.

For example, according to one embodiment of the invention, addition of an AND circuit in parallel to Memory 2 can avoid unpredictability of the states of the memory element in such a manner that an output signal of the AND circuit can control Gate 1 instead of Memory 2. In addition, to avoid erratic operation of Gate 1, it is operated by a gate control circuit in a synchronizing relation with the $f_1$ pulse train which has a higher pulse repetition rate than the other and, at the same time, pulse train $f_1$ is given an appropriate delay before it passes through Gate 1. Furthermore, to reset Memory 2 to a determined state a feedback circuit is provided between the gate control circuit and Memory 2.

FIGURE 3 is an embodiment of a differential frequency or recurrence rate circuit employing the above principle. In this circuit, Memory 2 is designed to give an output signal only when it is turned from the state II to the state I. Gate Control 6 is comprised by a conventional one-shot or monostable multivibrator and it gives an output pulse of a constant width and amplitude to Gate 1 when it receives a trigger input signal from OR circuit 5. The pulse width of Gate Control 6 is chosen less than $1/f_1$ and in some cases, less than half $1/f_1$. Delay 3 is inserted before Gate 1 and, preferably, has a delay time larger than the pulse width of pulses in trains $f_1$ and $f_2$ and smaller than the pulse width of the output pulse of Gate Control 6. AND gate 4 is comprised by a conventional diode or transistor AND circuit, and it gives an output signal when it receives two input pulses in phase coincidence as illustrated at points U, V and W, Z in FIGURE 2. OR 5 gives an output signal to Gate Control 6 when it receives a signal or signals from either AND 4 or Memory 2. OR 5 may be obviated in some instance by means of modifying circuit arrangements of AND 4 and Memory 2. The output pulse of Gate Control 6 not only controls Gate 1 but also resets Memory 2 from the state II to the state I through a differentiating circuit $(d/dt)$ 9, which is, preferably, designed to give a differentiated feedback impulse at the beginning or the end of the output pulse of Gate Control 6.

Operation of the device will now be explained referring to FIGURES 4 (A), (B). FIGURE 4(A) shows the operational time chart when corresponding pulses arrive at each terminal $T_1$, $T_2$ in separate time relationship. First pulse of $f_1$ is supplied to Delay 3 in parallel to AND 4 as well as to Memory 2. Because of the assumption that Memory 2 is original in the state I, it does not change its state upon the arrival of the first pulse of $f_1$. No output signal arises from AND 4 because there is no $f_2$ pulse in phase coincidence with the pulse of $f_1$. Gate 1 is kept conductive. Accordingly, after the delay time of Delay 3, the first pulse of $f_1$ passes through Gate 1 and appears at $T_3$ as an output pulse. Next, after a while the first $f_2$ pulse arrives at $T_2$ and changes the state of Memory 2 from I to II. However, there is no output from Memory 2 since it is being switched from state I to state II. Subsequently, Memory 2 is turned by second $f_1$ pulse from the state II to the state I and supplies an output pulse to OR 5. Gate Control 6 supplies an output pulse of a constant width and amplitude upon being triggered by a signal from OR 5. Hence, gate 1 is "closed" or turned off for a corresponding period and prevents the second $f_1$ pulse (after being delayed by Delay 3) from passing through. A feedback impulse from circuit 9 as well as the third $f_1$ pulse will not thereafter change the state of Memory 2 since it was reassumed the state I condition. Hence the third $f_1$ pulse passes through Gate 1 and appears at $T_3$. Thus, according to this circuit an output pulse train is obtained at $T_3$ which is equal to $f_1-f_2$.

FIGURE 4 (B) explains the operation of the FIGURE 3 circuit when corresponding $f_1$ and $f_2$ pulses arrive at $T_1$, $T_2$ in substantial phase coincidence with each other. In this instance, since AND 4 receives at least parts of two input pulses at the same time, it gives a trigger pulse through OR 5 to Gate Control 6 irrespective of the operation of Memory 2. Since Gate Control 6 makes Gate 1 cut off for a predetermined period as previously explained, the first $f_1$ pulse which arrived in phase coincidence with the $f_2$ pulse after delay in circuit 3, cannot pass through Gate 1. Hence, similar to the situation shown in FIGURE 4 (A) where a $f_1$ pulse arrives subsequent to a $f_2$ pulse and is prevented from passing through Gate 1. A $f_1$ pulse arriving at the same time with a $f_2$ pulse likewise is prevented from passing through Gate 1.

A feedback impulse from $(d/dt)$ circuit 9 makes the state of Memory 2, which previously was in the state I, revert to the state I condition regardless of its state as a consequence of the application thereto of the simultaneous $f_1$ and $f_2$ pulses. As previously indicated, when Memory 2 receives two input pulses in substantially phase coincidence with each other, its state is unpredictable and may be either in I or in II. If it is in the state I, it keeps its state after arrival of the feedback impulse from $(d/dt)$ circuit 9. However, if it is in the state II, it is turned by the impulse from the state II to the state I in accordance with the beginning of the output pulse of Gate Control 6. If $(d/dt)$ circuit is designed to give an impulse at the end of the output pulse. Memory 2 gives again a driving trigger through OR 5 to Gate Control 6. This is illustrated by dotted line wave forms in FIGURE 4 (B). Gate 1 is again cut off by Gate Control 6 for another predetermined period, which will end however before the next $f_1$ pulse arrives at $T_1$ because the pulse width of Gate Control 6 may be chosen less than half of $1/f_1$ as previosuly indicated. Accordingly the next $f_1$ pulse appears at $T_3$ as an output $f_1-f_2$.

Though AND 4 is connected to terminals $T_1$, $T_2$ in parallel to Memory 2 and OR 5 is connected to both AND 4 and Memory 2 it will be appreciated that other modifications may be employed to attain the same back up operation as in FIGURE 3. In FIGURE 13, OR 5 receives signals from both $T_2$ and Memory 2, while AND 4 receives signals from both OR 5 and $T_1$. Gate Control 6 is driven directly by AND 4 and controls Gate 1. Since operation of this circuit is similar to that of FIGURE 3, a further detailed explanation is believed unnecessary.

A parallel connection of the systems shown in FIGURE 3 is employed to obtain $f_1-f_2$, $f_2-f_1$ when it is unpredictable which frequency of pulse train $f_1$ or $f_2$ is higher. FIGURE 14 illustrates this parallel connection in which a single AND 4 works for both channels wherein the channel with the primed reference numerals is similar to the channel with the non-primed numerals which in turn is similar to FIGURE 3 and operates in the same manner. The only difference being that the pulse train $f_1-f_2$ is obtained at the output terminal $T_4$. It will be appreciated that other embodiments of the invention which will be explained later can be also used in tandem similarly to FIGURE 14.

Another example of the back up circuits according to this invention, is the addition of an additional gate circuit cooperating with Memory 2 and Gate Control 6. FIGURE 5 shows an embodiment employing a selective gate circuit 7 in series with Delay 3. Memory 2 controls the selective gate 7 thereby, operably controlling gate 1 through Gate Control 6. In FIGURE 5, Selection Gate 7 is a selective gate circuit to receive $f_1$ pulses and to transmit then selectively either to X line or to Y line dependent upon the state of Memory 2. Selection Gate 7 may be comprised by conventional diode gates or transistor gates. FIGURE 7 shows an example of a suitable circuit configuration for Selection Gate 7 in which a pair of transistors $T_{r1}$, $T_{r2}$ have their emitter-collectors connected commonly to $T_1$ through resistors and their bases (control electrodes) $B_1$, $B_2$ are reversely driven by output signals of Memory 2. Terminal X is connected to $T_1$ when $T_{r1}$ is on, with Memory 2 in state I, while terminal Y is connected to $T_1$ when $T_{r2}$ is on, with Memory 2 in state II. Memory 2 is preferably comprised by an asymmetrical flip-flop circuit. It is in the state II when it receives a $f_2$ pulse and in the state I when it receives a $f_1$ pulse through Delay (II). Delay times of Delay (I) and Delay (II) and the pulse width of Gate Control 6 are chosen to have an appropriate time compared with not only $1/f_1$ and $1/f_2$ but the pulse width of Gate Control 6.

Operation of this circuit will be apparent when corresponding $f_1$ and $f_2$ pulses arrive at $T_1$ and $T_2$ separately in phase. Every $f_2$ phase turns Memory 2 from the state I to the state II. The next succeeding $f_1$ pulse is transmitted to the line Y and turns Memory 2 from the state II to the state I to allow the next $f_1$ pulse to be transmitted to the line X and to pass through Gate 1 to output terminal $T_3$. Though Gate Control 6 is driven by every $f_1$ pulse transmitted to the line Y, the next succeeding $f_1$ pulse can pass through Gate 1 because the pulse width of Gate Control 6 is chosen much less than $1/f_1$. Accordingly, there appears $f_1—f_2$ pulse train at output terminal $T_3$.

The operation of the FIGURE 5 circuit will be explained referring to FIGURE 6 only with respect to the condition when corresponding $f_1$ and $f_2$ pulses arrive at $T_1$ and $T_2$ in substantial phase coincidence. An assumption is made that a $f_2$ pulse arrives at $T_2$ and turns Memory 2 to the state II during the time that a $f_1$ pulse is passing through Selective Gate 7 to the line X. Hence, a single $f_1$ pulse is divided by Selective Gate 7 into a portion transmitted to the line X and another portion transmitted to the line Y. The portion of the $f_1$ pulse transmitted to the line Y drives Gate Control 6 as well as Delay (II) 8. An output pulse of Delay (II) 8 turns back Memory 2 to the state I after a predetermined delay while Gate Control 6 cuts off Gate 1 for a predetermined period and prevents the portion of the $f_1$ pulse transmitted to the line X and delayed by Delay 3 from passing through Gate 1. Accordingly, there appears an accurate $f_1—f_2$ pulse train at $T_3$ even in this case. It is, of course, possible to add further AND gate to Memory to make its operation sure enough.

Back up circuits may be also comprised by an additional conventional gate connected in series to the $f_1$ pulse channel in the circuit shown in FIGURE 5. This is shown by FIGURE 15 in which an additional gate, Gate 10, is connected between Delay (I), 3 and input terminal $T_1$ and it is controlled by Memory 2 which is comprised by a conventional flip-flop. By this arrangement every $f_2$ pulse prevents the next succeeding $f_1$ pulse from passing through Gate 10 when corresponding $f_1$ and $f_2$ pulses arrive at $T_1$ and $T_2$ separately in phase, as explained in connection with FIGURE 6, AND 4 and gate control 6 do the same. Gate 1 is controlled by the Gate Control 6 which will be triggered by AND 4. This circuit fulfills the back up operation as explained referring to FIGURE 3 and FIGURE 5 when the corresponding pulses arrive in substantial phase coincidence. Gate Control 6 gives a resent impulse to Memory 2 in accordance with its output pulse similarly to the circuit in FIGURE 3. Since it will be apparent that the circuit shown in FIGURE 15 provides accurate $f_1—f_2$ pulse train at the output terminal $T_3$, taken in connection with the explanations given in FIGURE 3 and FIGURE 5, further explanation is believed unnecessary.

Back up circuits may be also comprised by an additional gate circuit in parallel to the main $f_1$ pulse channel and in series to Gate Control 6 as shown in FIGURE 8. A Gate (II) 11 is connected to $T_1$ in parallel to Delay 3-Gate 1 and in series to Gate Control 6. Gate 11 is controlled by Memory 2 which takes different states I, and II dependent upon its input signals 1 and II. Gate 11 is designed to be on when Memory 2 is in the state II. By this circuit, every $f_2$ pulse turns Memory 2 to the state II, consequently, next corresponding $f_1$ pulse passes through Gate (II) 11 and drives Gate Control 6 which cuts off Gate (I) 1 for a predetermined time and resets Memory 2 through the circuit 9 to the state I. Accordingly, every $f_2$ pulse prevents the next succeeding or a time coincident $f_1$ pulse from passing through Gate (I) and hence an accurate $f_1—f_2$ pulse train appears at $T_3$.

However, in this system there is a possibility of misoperation or erratic operation when the recurrence rate or frequency of the $f_1$ pulse train is close to or equal to that of the $f_2$ pulse train and corresponding pulses repetitively arrive at $T_1$ and $T_2$ in substantial phase coincidence or in a close phase relation. FIGURE 9 (A) illustrates this erratic operation. This is the case where next $f_2$ pulse arrives at Memory 2 before Memory 2 is reset through circuit 9 by Gate Control 6 which was driven by the first $f_1$ pulse following the $f_2$ pulse that set Memory 2 to the II or open state, and hence prevented transmission of the next succeeding $f_1$ pulse through gate 1. In such an eventuality, though two $f_2$ pulses arrived at $T_2$, only one $f_1$ pulse is prevented from passing through Gate 1 thereby resulting in an erratic or incorrect output.

Referring to FIGURE 9 (B), a frequency range of $f_1$ pulses where the erratic operation may take place is found to have the following relationship with the frequency of $f_2$ pulses and the pulse width T of Gate Control 6;

$$f_2 \leqq f_1 \leqq \frac{1}{1/f_2 - T}$$

Accordingly, the frequency range can be made considerably small by chosing T at a very small value. However, it is impossible to reduce the range perfectly to zero.

FIGURE 10 shows a circuit to avoid the above mentioned erratic operation. A further additional gate 12 and delay circuits 13, 14 are added to the circuit shown in FIGURE 8. Memory 2 makes both Gate (II) and Gate (III) on or conductive when it is in the state II and off or blocking when it is in the state I. This circuit operates similarly to that shown in FIGURE 8 except the particular frequency range of $f_1$ and $f_2$ which was explained above as a range of erratic operation. In this instance, $f_2$ pulses cannot pass through Gate (III), 12 because Memory 2 is reset to the state I by Gate Control 6 when $f_2$ pulses arrive at $T_2$. Accordingly, the operation is somewhat the same as explained in connection with FIGURE 8, but differs therefrom as follows:

In the particular frequency range of $f_1$ pulses, the first $f_2$ pulse prevents a corresponding $f_1$ pulse from passing through Gate (I) and the second $f_2$ pulse will arrive at $T_2$ before Memory 2 is reset to the state I by Gate Control 6 which is driven by the same corresponding $f_1$ pulse. However, the second $f_2$ pulse can pass through Gate (III) 12 because Memory 2 is in the state II. After the second $f_2$ pulse arrives at $T_2$, Gate Control 6 resets Memory 2 to the state I. Subsequently, the second pulse which is delayed by Delay (III), 14 arrives at Memory 2 and resets it to the state II. Accordingly, every $f_2$ pulse prevents a corresponding $f_1$ pulse from passing to output terminal $T_3$ by this circuit and there appears an accurate $f_1—f_2$ pulse train at $T_3$. Delay (III) may be obviated when a delay of changing states in Memory can be used as a delay element. FIGURE 12 (A) illustrates this operation.

From the foregoing explanation it will be appreciated that there are the following relations among delay times and $f_1$ and $f_2$ frequencies and the pulse width of Gate Control 6;

$$D_1 < T < 1/f_1$$
$$T + D_2 < D_3 < 1/f_2$$

wherein $D_1$, $D_2$, $D_3$: delay times of Delay (I), (II), (III), respectively. If Delay (II) is obviated, it is of course that $D_2 \doteqdot 0$.

FIGURE 11 shows another simpler circuit to avoid the problem solved by the circuit of FIGURE 12. In this embodiment, Memory 2 is modified so that it may be turned from the state II to the state I even by $f_2$ pulses, Memory 2 is preferably comprised by a symmetrical flip-flop circuit and both a $f_2$ pulse and an impulse from circuit 9 drive symmetrically said flip-flop circuit so that Memory 2 turns between states I and II dependent upon its former state when it receives an input signal from either $T_2$ or circuit 9.

By this circuit, a $f_2$ pulse which arrives during the pulse of Gate Control 6 can turn Memory 2 from the state II to the state I. Subsequently an impulse from circuit 9 turns Memory 2 from the state I to the state II. Therefore, the corresponding next succeeding $f_1$ pulse can pass through Gate (II), 11 and prevents itself from passing through Gate (I). Consequently, there appears an accurate $f_1-f_2$ pulse train at the output $T_3$. AND circuit 4 is added to always set Memory 2 to the state II when both a $f_2$ pulse and an impulse from circuit 9 arrive at the same time. FIGURE 12 (B) shows this operation time chart.

From the foregoing description it will be appreciated that according to this invention, simple back up circuits are provided to avoid erratic operation when corresponding pulses arrive at each input terminal in phase coincidence and that this invention provides an output pulse train having a recurrence rate or frequency corresponding accurately to the difference in recurrence rate or frequency of two input pulse trains.

It is advantageous in this invention to be comprised by conventional circuitry such as logic elements. Logic elements operated by liquid pressure may preferably also be used in some instances such as industrial controls using liquid servo-motors. This invention, because of its great accuracy and comparative simplicity can be applied advantageously to the precise control of the rotational speed of machines, accurate telemetering of measurements or other digital control problems because of its simple configuration and its high degree of accuracy.

While we have described the invention in connection with certain embodiments thereof, it will now be understood that further modifications may now suggest themselves to those skilled in the art and it is intended to cover such modifications as fall within the scope of the appended claims.

We claim:

1. A differential rate system having first and second sets of pulsed waveform signals applied to the input thereof for deriving an output signal representative of the difference in frequency of the two sets of pulsed input signals, the improvement comprising main gate means having input, output and control terminals, gate control means coupled to control terminal of said main gate means for turning off the main gate means for a predetermined time interval in the presence of an energizing main gate turn-off signal to the gate control means, delay means having its output operatively coupled to the input of said main gate means and having its input operatively coupled to the first set of pulsed waveform input signals, memory means having two stable states of operation and having an input operatively coupled to and controlled by the second set of pulsed waveform input signals and its output operatively controlling energization of said gate control means, said memory means being switched to a first stable state of operation thereby enabling energization of said gate control means upon occurrence of a second signal pulse, and means for resetting said memory means to its second stable state upon the occurrence of the next succeeding first signal pulse, said memory means in its second stable state allowing transmission of signal pulses through the delay means and the main gate means to the output thereof.

2. The differential frequency rate system according to claim 1 further including additional gate means having its output operatively controlling energization of said gate control means and having its input coupled to both said first and second sets of pulsed waveform input signals for supplying an energizing main gate turn-off signal to said gate control means upon the simultaneous occurrence of first and second signal pulses.

3. A differential frequency rate system for deriving from first and second pulse trains of variable frequency rate wherein the frequency of said first train is either equal to or larger than that of said second train, a third pulse train representing the frequency difference between said first and second trains, said system comprising, first and second input lines receiving said first and second pulse trains, respectively; delay means connected to said first input line for providing to said first train a predetermined delay time; main gate means connected in series with said delay means and having on and off conditions for thereby allowing or preventing transmission of said first pulse train; gate control means operatively connected with said main gate means for controlling the condition of said main gate means for a predetermined time; memory means having two output states and being operatively connected with both said second input line and said gate control means and being able to be operably actuated between the two states by both said second pulse train and a signal corresponding to a pulse in said first pulse train the transmission of which through said main gate means has been prevented for operably controlling said gate means in accordance with every occurrence of pulses in said second pulse train; additional gate means operatively connected with said gate control means and said first and second input line, and being operably controlled by the occurrence of pulses in said second pulse train for controlling said gate control means when corresponding pulses of said first and second pulse trains arrive at each input line in substantial phase coincidence with each other; and means operatively connected with said gate control means and said memory means for actuating said memory means from one output level to the other upon occurrence of every prevention of transmission by said main gate of said first pulse train; whereby said third train appears at the output of said main gate means.

4. A differential frequency rate system for deriving from first and second pulse trains of variable recurrence frequency rate a third pulse train representing the instantaneous frequency difference therebetween, the system comprising, first and second input lines receiving said first and second pulse trains, respectively; first and second delay means connected to said first and second input lines, respectively, for providing both said trains a predetermined delay time; first and second main gate means connected, respectively, in series with said first and second delay means and having on and off conditions for allowing or preventing transmission of said first and second pulse trains, respectively; first and second gate control means operatively connected with said first and second main gate means, respectively for controlling the conditions of each said gate means for a predetermined time; first and second memory means each having different output levels and each being operatively connected to one of said first and second input lines and operatively actuated between the different states by the one of said pulse trains for controlling the other of said first and second gate control means in accordance with every occurrence of pulses in the one of said pulse trains; back up means operatively connected with said first and second gate control means and receiving said first and second pulse train for controlling said first and second gate control means when corresponding pulses of said both pulse trains arrive at respective input lines in substantial phase coincidence with each other; first and second feedback means being operatively connected with said first and second gate control means and first and second memory means for actuating said memory means from one output level to the other in accordance with every occurrence of prevention of transmission of said first and second pulse trains, respectively; whereby said third train appears at the output of either first main gate means or second main gate means dependent upon which of said first or second pulse train has the higher recurrence frequency rate.

5. A differential frequency rate device comprising, first and second input lines receiving first and second pulse trains, respectively; delay means connected to said first input line for providing said first pulse train with a predetermined delay time; main gate means provided with input, output and controlling connections and operatively connected with said delay means by said input connection for allowing or preventing transmission of said first pulse train dependent upon a controlling signal given to said controlling connection; gate control means operatively connected with said main gate means through said controlling connection for providing a controlling signal to said main gate for a predetermined time; memory means provided with two input and an output connections and having two output levels, one of the inputs thereof receiving said first pulse train while the other receiving said second pulse train and the output being operatively connected with said gate control means for actuating said gate control means when the output level changes from one to the other; additional gate means provided with said first and second pulse trains and being operatively connected with said gate control means for actuating said gate control means when corresponding pulses of said first and second pulse trains arrive at respective input line to substantial phase coincidence with each other; feedback means operatively connected between said gate control means and said memory means for resetting said memory means in accordance with the output signal of said gate control means; whereby a third pulse train corresponding to the frequency difference between said first and second pulse trains appears instantaneously at the output connection of said main gate.

6. A differential frequency rate device according to claim 5, in which said additional gate is comprised by an AND element having two input connections connected to said first and second input lines, respectively; and feedback means operatively intercoupled between said gate control means and said memory means comprised by a differential element for providing a reset impulse to said memory means at the end of the output signal of said gate control means.

7. A differential frequency rate apparatus according to claim 5, in which the output of said memory means is operatively connected to said gate control means through said additional gate.

8. A differential frequency rate apparatus according to claim 5, further comprising an OR element provided with two inputs and an output, the two inputs being connected with the outputs of both said memory means and said additional gate respectively, and the output being connected with the input to said gate control means.

9. A differential frequency rate system according to claim 3, in which said main gate means is comprised by a pair of gates which are operatively connected in series relation and one of said gates is controlled by said gate control means while the other of said gates is controlled by said memory means.

10. A differential frequency rate device comprising, first and second input lines receiving first and second pulse trains of various recurrence frequency, respectively; a first gate provided with input, two outputs, and controlling connections with said input connection being connected to said first input line and being capable of being selectively connected to one of the two output connections dependent upon a signal applied to said controlling connection; delay means connected to one of the output connections of said first gate; second gate means provided with input, output, and controlling connections and being connected to said delay means with the input connection thereof; gate control means operably connected between the other of the two output connections of said first gate and the controlling connection of said second gate for controlling transmission of said second gate for a predetermined time upon every receipt of an input signal from said first gate; memory means provided with two input and output connections having different states in accordance with input signals thereof, one of said input connections being operatively connected with said second input line for receiving said second pulse train as an input signal, the other of said input connections being operatively connected with the other of the two output connections of said first gate for receiving a reset pulse as an input signal, the output connection being operably connected with said controlling connection of said first gate for controlling selection of said first gate dependent upon the state thereof.

11. A differential frequency rate device according to claim 10, further comprising second delay means connected between the other of the input connections of said memory means and the other of the output connections of said first gate for giving a predetermined delay to the reset pulse supplied to said memory means.

12. A differential frequency rate apparatus for deriving from first and second pulse trains, the frequency of said first pulse train being either equal to or larger than that of said second pulse train, a third pulse train representing the instantaneous frequency difference between said first and second pulse trains, the system comprising, first circuit means for delaying said first pulse train; a first gate connected in series with said first circuit means for either allowing or preventing transmission of said delayed first pulse train; a second gate receiving said first pulse train in parallel to said circuit means for either allowing or preventing transmission of said first pulse train; a gate control circuit operably connected with said second gate and said first gate and having a control signal of a constant pulse width for controlling said first gate in accordance with said first pulse train transmitted by said second gate; a differential circuit connected with said gate control circuit for providing an impulse at the end of the control signal; and a memory circuit operably connected with said differential circuit and said second gate and receiving said second pulse train, the memory circuit having two different output levels dependent upon both said impulse and said second pulse train, for controlling said second gate in accordance with said output levels; whereby said third pulse train appears at the output of said first main gate.

13. A differential frequency rate apparatus according to claim 12, in which said memory circuit is provided with two input connections for receiving said second pulse train and said impulse, respectively, and is designed in such a manner that said memory circuit always provides the one of the output levels upon the receipt of a pulse from said second pulse train while it always provides the other of the output levels upon the receipt of the impulse from said differential circuit.

14. A differential frequency rate apparatus according to claim 12, further comprising an additional gate receiving both said second pulse train and the impulse from said differential circuit and exclusively setting said memory circuit to one of the output levels when it receives both a pulse of said second pulse train and the impulse in substantially phase coincidence relation.

15. A differential frequency rate apparatus according to claim 13, further comprising a third gate operably controlled by said memory circuit and receiving said second pulse train; second circuit means connected between said third gate and one of the input connections to said memory means designed to receive said second pulse train for delaying said second pulses supplied through said third gate; and a connection to the one of the input connections of said memory means for receiving said second pulse train in parallel with said third gate.

16. A differential frequency rate apparatus according to claim 15, in which the pulse width T of said gate control has the following relation with not only the frequencies $f_1$, $f_2$ of said first and second pulse train but the delay times $D_1$, $D_2$ of said first and second circuit means;

$$D_1<T<1/f_1$$

$$T<D_2<1/f_2$$

17. A differential frequency rate apparatus according to claim 16, in which said connection in parallel with the third gate includes a third circuit means for delaying said second pulse train, the delay time of which is $D_3$.

18. A differential frequency rate apparatus according to claim 17 in which the daley time $D_2$ of said second circuit means is chosen to satisfy the following condition:

$$D_1<T<1/f_1$$

$$T+D_3<D_2<1/f_2$$

wherein T is the pulse width of said gate control circuit,
$D_1$ is the delay time of said first circuit means,
$f_1$, $f_2$ are the frequencies of said first and second pulse train, respectively.

References Cited

UNITED STATES PATENTS

| | | | |
|---|---|---|---|
| 2,866,092 | 12/1958 | Raynsford | 328—154 |
| 2,985,773 | 5/1961 | Dobbie | 328—133 XR |

ARTHUR GAUSS, *Primary Examiner.*

STANLEY D. MILLER, *Assistant Examiner.*

U.S. Cl. X.R.

307—233, 247, 271; 328—154